(No Model.) 2 Sheets—Sheet 2.
L. P. HOYT.
EXPANSION GEARING FOR PLANING MACHINES.
No. 387,417. Patented Aug. 7, 1888.
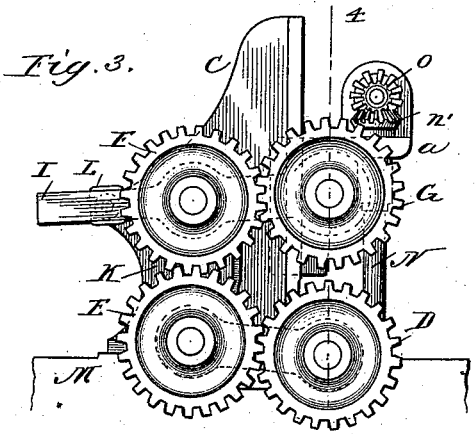
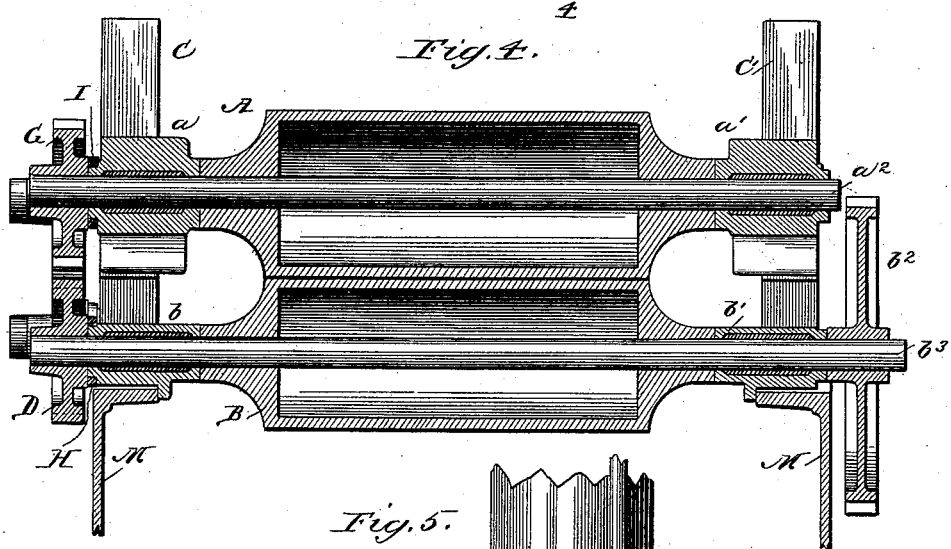
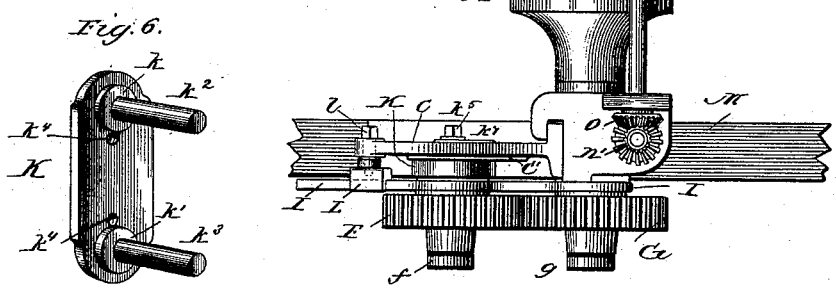
Witnesses,
W. Rossiter
L. S. Logan
Inventor
Lucius P. Hoyt.
By Chas. G. Page,
Atty.
N. PETERS, Photo-Lithographer, Washington, D.C.

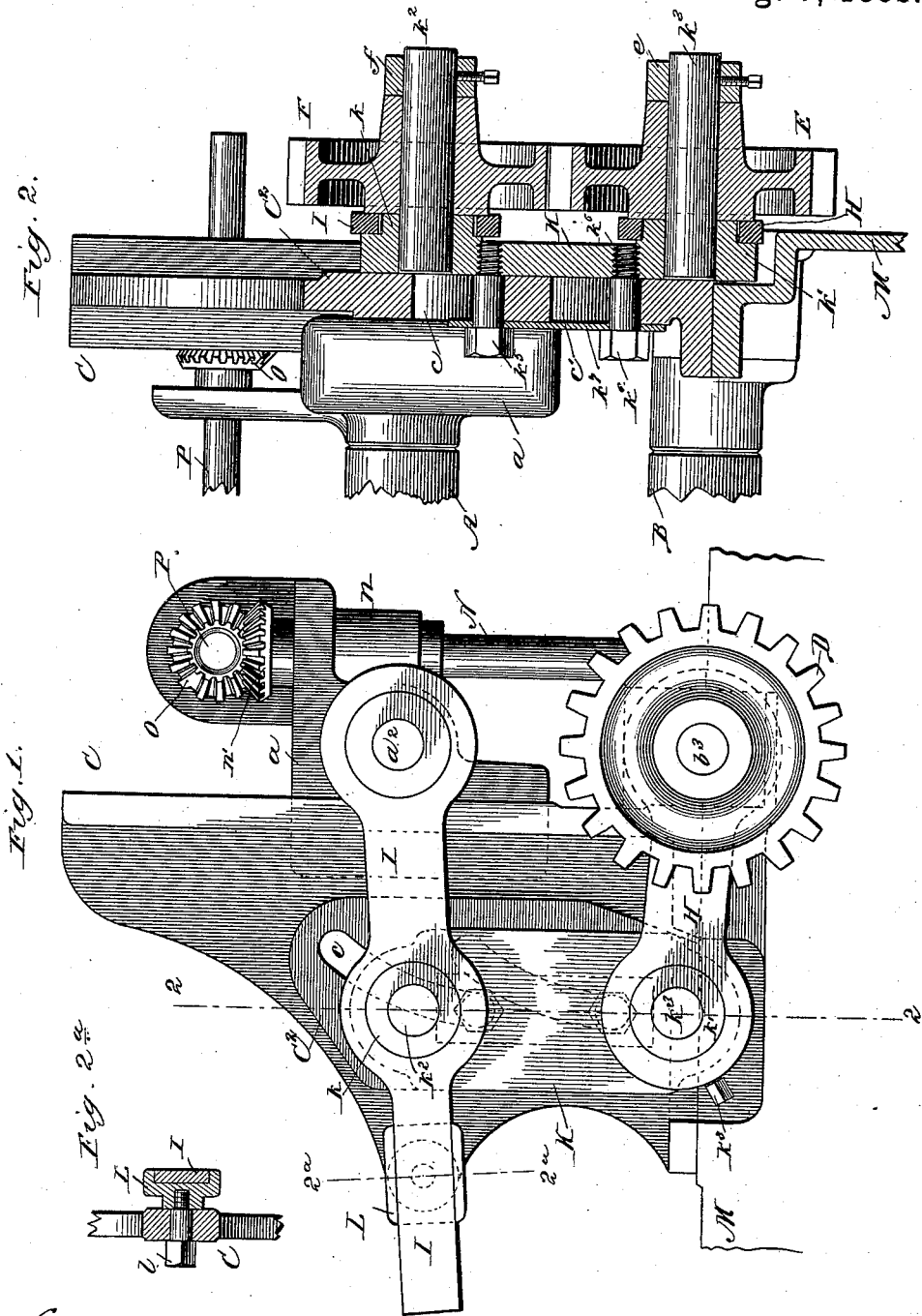

UNITED STATES PATENT OFFICE.

LUCIUS P. HOYT, OF AURORA, ILLINOIS.

EXPANSION-GEARING FOR PLANING-MACHINES.

SPECIFICATION forming part of Letters Patent No. 387,417, dated August 7, 1888.

Application filed January 31, 1888. Serial No. 262,513. (No model.)

*To all whom it may concern:*

Be it known that I, LUCIUS P. HOYT, a citizen of the United States, residing at Aurora, in the county of Kane and State of Illinois, have invented a certain new and useful Improvement in Expansion-Gearing, of which the following is a specification.

This invention relates to an improvement in that class of gearing known as "self-adjusting" or "expansion" gearing, and particularly applicable to the feed-rolls in planing or surfacing machines, wherein one roll journaled in adjustable boxes or bearings is in gear-connection with and driven from another roll journaled in stationary bearings, the adjustment in height of one of said rolls in such case necessitating an "adjustment" or "expansion," as it is commonly termed, of the gearing between the two rolls.

In a set or train of self-adjusting or expansion gearing involving the several characteristics of my improvement the "driving-gear-wheel" and the "driven gear-wheel," as they may be relatively termed for the purpose of distinction, are respectively arranged to operate about a stationary axis and movable or shifting axis, and are connected by a couple of intermediate gears arranged to turn about shifting axes, whereby, during an adjustment in position of the driven gear, the axes of rotation of the intermediate gears shift in position, in order to accommodate them to the change in position of the driven gear relatively to the driving-gear, and thereby preserve an operative gear-connection throughout the train of gearing.

Prominent objects of my invention in a set of gearing thus adapted for operation are to prevent crowding together and retardation of work as an incident to the shift and change in relative position of the gears; to maintain the axes of rotation of certain of the gears at all times equidistant; to maintain the gears at all times in proper and efficient relative working position regardless of the adjustment of the driven gear, and to effectively resist the tendency of certain of the gears to separate or force themselves apart during the adjustment or "expansion" and "contraction," as it may be called, of the gearing.

To the attainment of the foregoing and other useful ends the intermeshing intermediate gears are mounted at proper points upon a shifting bearing common to both gears, and hence while serving to keep their axes at all times in equidistant relationship permitting a change of position on the part of the intermediate gears relatively to the driving and driven gears. The centers or axes of the driving-gear and the next intermediate gear with which it is in mesh are at all times kept equidistant by a link-connection, which is at one end pivotally hung about the axis of the driving-gear and at its opposite end pivotally hung about the axis of the said intermediate gear. The centers or axes of the driven gear and the next intermediate gear with which it is in mesh are also at all times kept equidistant by a link or lever which is pivotally hung about the axes of both the driven gear and next adjacent intermediate gear. This lever is also extended beyond the point where it is hung about the axis of the intermediate gear and attached to a pivoted or oscillatory fulcrum by a sliding connection, whereby said lever is susceptible of both an end movement and a vibratory action. While serving, therefore, to keep the axes of the driven gear and the next intermediate gear equidistant, the lever is also employed as a means for supporting the shifting bearing which carries the intermediate gears, and at the same time permitting said bearing to shift in such direction as may be required by a change in position of the driven gear and consequent necessary change in position on the part of the intermediate gears.

Certain details of construction, all tending to the general efficiency of the expansion-gearing, are hereinafter particularly described.

In the drawings, Figure 1 represents in elevation, the mechanism of an expansion-gearing embodying my improvements with the driven gear and the intermediate gears removed for convenience of illustration. In this and succeeding views the expansion-gearing is represented as adapted for connecting together a couple of rolls, which, for example, are of particular service as feed-rolls in planing or surfacing machines. Fig. 2 is a vertical section on the line 2 2 of Fig. 1, portions only of the rolls being shown. Fig. 2ª is a detail representing a section through the lever and its pivoted fulcrum on the line 2ª 2ª of Fig. 1. Fig. 3 is a view, on a smaller scale, similar to Fig. 1, but representing all of the gears in place. Fig. 4 is a vertical section taken on a plane indicated by line 4 4 of Fig. 3, and showing in full both of the rolls. Fig. 5 is a top plan view with the greater portion of the rolls broken away. Fig. 6 represents in perspective a plate which serves to provide a shifting bearing for the intermediate gears.

In said drawings, A indicates an upper roll journaled in vertically-adjustable boxes or bearings $a$ and $a'$, and B denotes a lower roll journaled in boxes $b$ and $b'$, that are understood to be stationary. The adjustable boxes for the upper roll can be guided in any suitable way—for example, by standards C and C' rising from the sides M of the main frame of a machine requiring the presence of expansion-gearing.

With reference to the train of gearing, D indicates the driving-gear, fixed upon one of the journals or axle, $b^3$, of the lower roller; G, the driven gear, fixed upon one of the journals or axle of the upper roll, and E and F the two intermediate gears by which power is transmitted from the lower driving-gear to the upper driven gear.

The axes or centers of the driving-gear D and the next adjacent intermediate gear, E, with which it engages are at all times kept relatively equidistant by a link, H, which is hung at its ends, so as to be susceptible of swinging about the axes of rotation of these two gears. The axes or centers of the driven gear G and the next adjacent gear, F, with which it engages are likewise kept relatively equidistant by means of a link, I, which is hung to vibrate about the axes of rotation of said gears.

The axes or centers of the intermediate gears, E and F, are also kept equidistant with relation to one another, to which end the gear F is mounted upon a stud, $k^2$, rigid with a plate, K, and the gear E is similarly mounted upon a stud, $k^3$, likewise rigid with the said plate, which as a whole may be considered as a bearing carrying the intermediate gears.

The link H is conveniently hung at one end upon an end of the box or bearing $b$ for the lower roll, whereby it may swing about the roll-axis, and in like manner the upper link, I, is hung at one end upon an end of the adjustable box or bearing $a$ for the upper roll, whereby it may swing in proper relationship to the axis of such roll. As a means for pivotally connecting these links with the plate or bearing K, and at points whereby they may respectively swing about the axes of the intermediate gears, said plate or bearing is provided with bosses $k$ and $k'$, affording pivot-bearings upon which the links are hung. The studs on which the intermediate gears are mounted are arranged centrally with relation to the bosses, as in Fig. 6, in which way the links will be hung so as to swing, respectively, about the axes of rotation of one and the other of the intermediate gears.

The plate or bearing K, carrying the intermediate gears, is arranged to shift or slide, whereby while serving to maintain the intermediate gears in mesh with one another it may move in a manner to permit the required adjustment in position of said gears during such adjustment of the driven gear G as may be occasioned by an adjustment of the upper roll, A. In order that this shifting bearing K may be steadied and maintained at all times in one and the same plane of adjustment, a sliding connection is provided between the shifting bearing and a planed or smooth-face portion of the standard C, against which the bearing $k$ will be held, although permitted to move freely over such face.

As a simple means for holding the sliding bearing K against a suitable face portion of the standard C—for example, against the raised-face portion $C^2$ of such standard—the standard is provided with slots $c$ and $c'$ for the reception of pins or bolts $k^5$ and $k^6$, secured to the bearing K, but having sliding connection with the standard. With regard to certain details herein shown in this connection, the bolts $k^5$ and $k^6$ are attached both to the shifting bearing K and to a slide-plate, $k^7$, arranged so that the standard is embraced between said shifting bearing and slide-plate, which latter is indicated in dotted lines, Fig. 1, and shown in section in Fig. 2. The shifting bearing K and slide-plate $k^7$ move, therefore, together, and, being tied to one another by the bolts and respectively maintained against opposite sides of the standard, the accurate working of the shifting bearing in a determinate plane of adjustment will be insured.

The slots $c$ and $c'$ are curved for the purpose of providing free space for the lateral movements of the bolts during the necessary movements of the shifting bearing, the curvature of such slots being indicated partly in full and partly in dotted lines in Fig. 1.

The raised portion $C^2$ on the standard permits the bearing-face upon which the shifting bearing K works, to stand out to a convenient distance from the standard, and further provides a face which can be readily planed smooth and true.

The member I, which affords a link-connection between the axles or journals of the driven gear G and next adjacent intermediate gear, F, is extended beyond the point where it is hung upon the shifting bearing and fulcrumed upon the standard or other suitable fixture, thereby also constituting a lever for upholding the shifting bearing by which the intermediate gears are carried, it being seen that this link or lever, which is at one end hung upon the adjustable box $a$, is at or near its opposite end fulcrumed upon the standard, while intermediate of such points it has a pivotal connection with the shifting bearing K.

The lever I has a sliding connection with its fulcrum upon the standard, whereby it is susceptible of both an end movement and a vibratory action. Various mechanical devices could be employed for providing a sliding connection between the lever I and its fulcral support, a desirable construction herein illustrated being provided by a pivoted or swiveled fulcrum-block, L, herein conveniently attached to the standard by a pivot-bolt, $l$, and provided with a groove in which the lever is fitted to slide, as best shown in Fig. 2$^a$.

When the driven gear G is, for instance, raised in position, the link-connection between the axes of the gears D and E will serve to keep such axes at an invariable distance apart, and in like manner the link-connection between the gears G and F will serve to maintain said axes at a determinate distance from one another. During such action on the part of the driven gear, however, the shifting bearing K will shift, so as to permit the necessary rolling action or bodily movement on the part of the intermediate gears, whereby their position may be varied in accordance with the change of distance between the driving-gear D and the driven gear G.

As a result of providing for the lever I a fulcral support, such as hereinbefore set forth, an upward adjustment of the driven gear G will cause the lever to lift the shifting bearing K, which, however, being nearer than the gear G to the said fulcrum, will necessarily rise to a less extent than the extent of rise on the part of said gear. During such action the shifting bearing will also be drawn in a direction toward a line between the axes of the two gears D and G, the lever I at such time being permitted to slide upon the block L, which, while turning in conformity with the swing of the lever, also allows it to have the required extent of end movement.

When the gear G is lowered, the converse of the foregoing-described action on the part of the several members takes place.

I have herein shown a vertically-arranged rotary adjusting-rod, N, arranged to turn in a bearing, $n$, on the box $a$, and provided at its upper end with a gear, $n'$, engaging a gear, O, on a shaft, P, which can be operated by any suitable crank-movement for operating the rod, which is understood to work lower down in a threaded bearing (not herein shown, but further illustrated in an application filed by me January 31, 1888, Serial No. 262,512) and embodying means for both positively and automatically adjusting one of a pair of rolls. It is, however, understood that the expansion-gearing herein described can be applied to a roll rendered self-adjusting in any known or desired way, or having means for positively raising and lowering its boxes.

What I claim as my invention is—

1. The combination, with the gears G and F, respectively mounted upon separate adjustable bearings, of the lever pivotally connected with said bearings and having a sliding connection with a fulcral support, substantially as and for the purpose described.

2. The combination, with the gears D and G, of the intermediate gears mounted upon a shifting bearing, and the link H and lever I, arranged for maintaining the axes of the intermediate gears at respectively determinate distances with relation to the axes of the gears D and G, said lever being connected with a fulcral support by a sliding connection, substantially as and for the purpose set forth.

3. The combination, as hereinbefore set forth, of the driving-gear, the driven gear, the intermediate gears mounted upon a shifting bearing, and the lever I, pivotally attached to bearings for the driven gear and one of the intermediate gears, and having a sliding connection with a pivoted fulcral support, L, substantially as described.

4. The combination, with the gears G and D, of the intermediate gears mounted upon a shifting plate, K, providing a bearing common to both intermediate gears, the link H, hung at one end upon the stationary bearing for the gear D and at its opposite end hung upon a boss, $k'$, in the shifting bearing, and the link I, hung upon an adjustable bearing for the gear G and having a pivotal connection with said shifting bearing formed by the boss $k$, substantially as described.

LUCIUS P. HOYT.

Witnesses:
 WILLIS HOYT,
 C. C. HACKNEY.